United States Patent Office 3,502,770
Patented Mar. 24, 1970

3,502,770
PREPARATION OF COMPOSITION FROM
PODOPHYLLUM EXTRACTS
Jany Renz, Albert von Wartburg, and Emil Angliker,
Basel, and Hans Emmenegger, Muttenz, Basel-Land,
Switzerland, assignors to Sandoz Ltd. (also known as
Sandoz A.G.), Basel, Switzerland
No Drawing. Continuation of application Ser. No.
282,574, May 23, 1963. This application Mar. 21,
1966, Ser. No. 538,468
Int. Cl. A01n 9/02, 9/08; A61k 27/14; A61l 13/00
U.S. Cl. 424—195                                    3 Claims

ABSTRACT OF THE DISCLOSURE

The invention discloses preparation of compositions involving reaction of methanol-extracted podophyllum rhizomes with benzaldehyde.

This application is a continuation of our U.S. Ser. No. 282,574, filed May 23, 1963, now abandoned.

The present invention relates to new compositions and to a process for their production.

It was already known that such compounds as e.g. podophyllotoxin, 4′-demethyl-podophyllotoxin, α-peltatin and β-peltatin, which are present in the water-insoluble resin fractions from podophyllum rhizomes, display an antimitotic action, but the high toxicity of these compounds rendered impossible their therapeutic application. Glucosides of the above mentioned compounds have a lower toxicity, higher water solubility whilst the antimitotic effect stays the same, but they are very readily split up to revert to glucose and the corresponding highly toxic aglucone. The glucosides therefore have no advantage over the aglucones for use as oral therapeutical agents, since the aglucones are liberated from the glucosides by the digestive ferments. It was subsequently discovered that fermentative breakdown of the glucosides in the body can be prevented and their toxicity markedly reduced, without losing the valuable cytostatic properties of the starting material if some of the free hydroxyl groups of the sugar residue are reacted with carbonyl compounds to form the corresponding acetal compounds (see U.S.P. 3,060,169).

This process, however, suffers from the great disadvantage that pure podophyllum glucosides can only be obtained by difficult and expensive purification and separation processes, hence the condensation products of these glucosides with carbonyl compounds are available only in small quantities and at a very high price.

Surprisingly, it has now been discovered that the reaction products of extracts of components of the podophyllum plant with carbonyl compounds have an appreciably more pronounced effect than condensation products of pure podophyllum glucosides with carbonyl compounds. The toxicity of the composition produced in accordance with the present invention is furthermore approximately equal to that of the purified condensation products of podophyllum glucosides with carbonyl compounds.

The composition of matter in accordance with the invention may be produced by reacting cytostatically active principles of podophyllum plants with a carbonyl compound. Preferably the composition of matter may be produced by extracting dried, ground podophyllum rhizomes with a lower alcohol, diluting this extract with water, removing undesired accompanying matter, such as aglucones, resins and fatty substances by washing with a chlorinated hydrocarbon, transferring the active principles into an organic phase, without further purification, by shaking with a suitable solvent or solvent mixture and condensing the resulting solution or the residue obtained therefrom by evaporation of the solvent with a carbonyl compound.

Dichloroethane may be used with advantage for washing out the undesired accompanying substances, while a chloroform/butanol mixture may be used, for example, as a solvent in transferring the active principles of the podophyllum plant into the organic phase.

The crude extract used for condensation may be obtained from podophyllum plants of any type e.g. *Podophyllum peltatum* or *Podophyllum emodi*. Any of the aliphatic aromatic and heterocyclic ketones or aldehydes may be used as carbonyl compound; benzaldehyde has proved to be especially suitable. The compositions of matter produced in accordance with the above process as well as pharmaceutical compositions, containing in addition to an inert carrier, one or more of said compositions of matter, are included in the present invention.

In the following table, the cytostatic effect of the condensation product of a crude extract of *Podophyllum emodi* with benzaldehyde (termed "SPG 827"), produced in accordance with the invention, is compared with that of the pure podophyllotoxin-benzylidene-β-D-glucoside.

(A) Cytostatic action in vitro

Therapeutic agent:                                  $DE_{50}$, μg.ml.
   SPG 827 _____ 0.5
   Pure podophyllotoxin-benzylidene - β - D - gluco-
     side _____ 3.5

($DE_{50}$=that dosage which inhibits by 50% the multiplication of P-815 mastocytoma cells in vitro)

Furthermore, approximately seven times more pure podophyllotoxin-benzylidene-β-D-glucoside than SPG 827 were required to obtain total mitosis inhibition in a culture of embrionic fibroblasts of fowls.

(B) Toxicity (mouse, acute)

Therapeutic agent:                                          $DL_{50}$
   SPG 827 _____mg./kg. i.v__ 220
                                       mg./kg. p.o__ 680
   Pure podophyllotoxin-benzylidene-β-D-glucoside
                                       mg./kg. i.v__ 250
                                       mg./kg. p.o__ 760

($DL_{50}$=that dosage which causes 50% of the animals tested to die)

(C) Inhibition of growth of Ehrlich's ascites tumor of the mouse.—Treatment: Twice daily i.p., total of 16 injections. Subsequent determination of the total number of tumor cells in the abdominal cavity and comparison with untreated control mice.

| | Percent inhibition of tumor growth | |
|---|---|---|
| Dosage (mg./kg.) | SPG 827 | Pure podophyllotox-in-benzylidene-β-D-glucoside |
| 2 | 92 | 0 |
| 5 | 100 | 0 |
| 10 | 100 | 0 |
| 20 | 100 | 7 |
| 40 | 100 | 47 |

The compositions in accordance with the invention are, furthermore, superior to the pure condensation products of podophyllum glucosides with carbonyl compounds as they are easier and cheaper to produce than are the pure compounds.

Thus, for example, both the preliminary extraction of the drug with chlorinated hydrocarbon (U.S.P. 3,060,169) and above all the tedious isolation of the individual pure glucosides are superfluous in this process.

The following examples set forth representative illustrative embodiments of the invention. In such examples, the parts are by weight unless otherwise indicated; the relationship between parts by weight and parts by volume is the same as that between grams and milliliters.

EXAMPLE 1

Dried rhizomes of *Podophyllum emodi* containing about two percent of glycosides are finely ground and exhaustively extracted wtih methanol at room temperature. The united extracts are concentrated to approximately ⅓ of their volume, and then shaken out with dichloroethane, after addition of half the volume of water. This dichloroethane solution, which is preferably washed once more with water, contains the aglucones, resins, fatty materials and accompanying matter and is practically free of podophyllum glucosides. The aqueous-methanolic solution is united with the wash-water from the dichloroethane fraction and this in turn shaken out with a 4:1 chloroform-butanol mixture.

The united chloroform-butanol extracts are evaporated, the residue dissolved in three parts of benzaldehyde and the solution stirred for two hours at room temperature with two parts of zinc chloride. It is then diluted with an equal amount of water and the condensation product shaken out with chloroform. By squirting the concentrated chloroform solution into benzine and washing out the resulting precipitate with benzine the condensation product is obtained free of benzaldehyde and benzoic acid. This precipitation operation may be repeated a number of times in order to obtain a particularly low aglucone content.

A product is obtained constituted by an aglucone and resin fraction, podophyllotoxin-benzylidene-$\beta$-D-glucoside, 4'-demethyl-podophyllotoxin - benzylidene-$\beta$-D-glucoside, unreacted glucosides and unidentified accompanying matter.

EXAMPLE 2

In manner analogous to that described in Example 1 a product is obtained from dried rhizomes of *Podophyllum peltatum* containing about half a percent of glycosides, which product is constituted by an aglucone and resin fraction, podophyllotoxin - benzylidene-$\beta$-D-glucoside, $\beta$-peltatin - benzylidene-$\beta$-D-glucoside, 4'-demethyl-podophyllotoxin-benzylidene-$\beta$-D-glucoside, $\alpha$-peltatin-benzylidene-$\beta$-D-glucoside, unreacted glucosides and unidentified accompanying matter.

EXAMPLE 3

Extraction of the dried rhizomes of *Podophyllum emodi* containing about two percent of glycosides and condensation with benzaldehyde are effected in manner analogous to that described in Example 1, but the aqueous methanol extract is freed of undesired accompanying materials before washing with dichloroethane by means of a concentrated aqueous lead acetate solution. A condensation product constituted by an aglucone and resin fraction, podophyllotoxin-benzylidene-$\beta$-D-glucoside, 4'-demethyl-podophyllotoxin-benzylidene-$\beta$-D-glucoside, unreacted glucosides and unidentified substances is thus obtained.

EXAMPLE 4

A condensation product is obtained from *Podophyllum peltatum* containing about half a percent of glycosides in manner analogous to that of Example 3, which product is constituted by an aglucone and resin fraction, podophyllotoxin-benzylidene-$\beta$-D-glucoside, $\beta$-peltatin-benzylidene-$\beta$-D-glucoside, 4'-demethyl-podophyllotoxin-benzylidene-$\beta$-D-glucoside, $\alpha$-peltatin-benzylidene-$\beta$-D-glucoside, unreacted glucosides and unidentified accompanying matter.

It should be noted that the actual composition of the final products obtained depends on the glycoside content of the drug used as starting material. For example, using *Podophyllum emodi* as starting material, the following ranges are obtainable:

| | Percent |
|---|---|
| Aglucone and resin fraction | 0 to 10 |
| Podophyllotoxin-benzylidene-$\beta$-D-glucoside | 50±40 |
| 4'-demethyl - podophyllotoxin - benzylidene-$\beta$-D-glucoside | 15±10 |
| Unreacted glucosides | 0 to 10 |
| Unidentified accompanying matter | 0 to 50 |

Using *Podophyllum peltatum* as starting material, the following ranges are obtainable:

| | Percent |
|---|---|
| Aglucone and resin fraction | 0 to 10 |
| Podophyllotoxin-benzylidene-$\beta$-D-glucoside | 30±30 |
| $\beta$-Peltatin-benzylidene-$\beta$-D-glucoside | 30±30 |
| 4'-demethyl - podophyllotoxin - benzylidene-$\beta$-D-glucoside | 10±10 |
| $\alpha$-Peltatin-benzylidene-$\beta$-D-glucoside | 20±20 |
| Unreacted glucosides | 0 to 10 |
| Unidentified accompanying matter | 0 to 20 |

What is claimed is:

1. A process for the production of a composition from podophyllum which comprises extracting dried ground podophyllum rhizomes from the group consisting of *Podophyllum emodi* and *Podophyllum peltatum* with methanol, diluting the extract with water, removing undesired accompanying matter by washing with dichloroethane, taking up the active principles, without further purification, from the aqueous-methanolic solution by shaking with a mixture of chloroform containing from 10 to 30% by volume of butanol and reacting the said active principles with benzaldehyde.

2. A process according to claim 1, in which the podophyllum is *Podophyllum emodi*.

3. A process according to claim 1, in which the podophyllum is *Podophyllum peltatum*.

References Cited

UNITED STATES PATENTS 3,060,169    10/1962    Stoll.

FOREIGN PATENTS 823,068    11/1959    Great Britain.

OTHER REFERENCES

Masinova, J. Nat. Cancer Inst. vol. 18, No. 3, March 1957, pp. 359–369.

Kelly, J. Nat. Cancer Inst. vol. 14, No. 4, February 1954.

JAMES A. PATTEN, Primary Examiner

U.S. Cl. X.R.

260—210; 424—180